United States Patent
Kobayashi

(10) Patent No.: US 7,936,466 B2
(45) Date of Patent: May 3, 2011

(54) INFORMATION PROCESSING APPARATUS AND ITS CONTROL METHOD FOR MANAGING DISTRIBUTED PROCESSING OF AT LEAST ONE OF THE DEVICE INFORMATION AND OPERATION STATES

(75) Inventor: Noriyuki Kobayashi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 997 days.

(21) Appl. No.: 11/449,319

(22) Filed: Jun. 8, 2006

(65) Prior Publication Data

US 2006/0279766 A1 Dec. 14, 2006

(30) Foreign Application Priority Data

Jun. 8, 2005 (JP) ................................. 2005-168409

(51) Int. Cl.
*G06K 15/00* (2006.01)
(52) U.S. Cl. ...................... 358/1.14; 358/1.15
(58) Field of Classification Search .................. 358/296, 358/474, 1.1–1.18
See application file for complete search history.

(56) References Cited

U.S. PATENT DOCUMENTS

| | | | | |
|---|---|---|---|---|
| 5,287,194 A * | 2/1994 | Lobiondo | ..................... | 358/296 |
| 6,407,826 B2 * | 6/2002 | Hashimoto et al. | ........... | 358/296 |
| 7,180,626 B1 * | 2/2007 | Gassho et al. | ................. | 358/1.6 |
| 2002/0041388 A1 * | 4/2002 | Aoki | ............................ | 358/1.14 |
| 2002/0097423 A1 * | 7/2002 | Qiao | ............................ | 358/1.14 |
| 2002/0149789 A1 * | 10/2002 | Okazawa | ...................... | 358/1.14 |
| 2002/0194180 A1 * | 12/2002 | Alsop et al. | ..................... | 707/10 |
| 2003/0053112 A1 * | 3/2003 | Motosugi et al. | ............. | 358/1.14 |
| 2004/0070779 A1 * | 4/2004 | Ferlitsch | ...................... | 358/1.13 |
| 2005/0275882 A1 * | 12/2005 | Yasuda et al. | ................ | 358/1.15 |
| 2006/0039026 A1 * | 2/2006 | Lofthus et al. | ............... | 358/1.15 |

FOREIGN PATENT DOCUMENTS

| | | | |
|---|---|---|---|
| JP | 2003-150363 A | 5/2003 | |
| JP | 2004-046774 A | 2/2004 | |

OTHER PUBLICATIONS

English Machine Translation of Japanese Publication No. 2003/150363, Matsumoto Kenichi.*

* cited by examiner

*Primary Examiner* — Benny Q Tieu
*Assistant Examiner* — Marcellus Augustin
(74) *Attorney, Agent, or Firm* — Rossi, Kimms & McDowell LLP

(57) ABSTRACT

An information processing apparatus manages distributed processing by a plurality of devices which are connected to a computer network and have a power-saving mode. The apparatus includes a retriever, arranged to retrieve device information and operation states of the plurality of devices, and a selector, arranged to select target devices of the distributed processing based on at least one of the device information and operation states.

10 Claims, 10 Drawing Sheets

FIG. 10

|  | PRINTER 1201 | PRINTER 1202 | PRINTER 1203 | PRINTER 1204 |
|---|---|---|---|---|
| SLEEP SHIFT TIME (MINUTES) | 30 | 10 | — | 3 |
| PROCESSING CAPACITY | 13.3 | 20 | — | 33 |
| JOB PROCESSING AMOUNT (NUMBER OF DIVIDED JOBS) | 400 | 200 | — | 100 |

INFORMATION PROCESSING APPARATUS AND ITS CONTROL METHOD FOR MANAGING DISTRIBUTED PROCESSING OF AT LEAST ONE OF THE DEVICE INFORMATION AND OPERATION STATES

FIELD OF THE INVENTION

The present invention relates to an information processing apparatus and its control method and, more particularly, to processing and control in which the distributed load system of grid computing is applied to information processing apparatuses such as a printer, multi-functional peripheral equipment, and the like connected to a computer network.

BACKGROUND OF THE INVENTION

A plurality of proposals have been made about a mechanism that attains high-speed processing by distributing a great deal of processing to a plurality of devices upon processing. For example, refer to IBM professional paper "Application of Grid Computing to Commercial Systems" http://www-6.ibm.com/jp/provision/no36/pdf/36_pprl.pdf for grid computing and the like.

In some cases, processing that requires huge amounts of time by fully utilizing a plurality of devices connected to a network and receiving a job from a client is executed. In such case, it is expected to implement higher-speed distributed processing by using the framework of grid computing to effectively utilize the processing capacities of a plurality of devices.

On the other hand, in recent years, the awareness of energy saving has heightened, and it is a common practice to automatically shift an unused device to a power-saving mode and to set it in a standby state. Such devices are connected via a network, and are controlled to process jobs requested from other devices. In such case, other devices request jobs regardless of the shift state to the power-saving mode and the consumption power of the job request destination device. As a result, the request destination device which will shift to the power-saving mode unless it receives job requests from other devices cannot shift to the power-saving mode, and loses chances to stand by in the power-saving mode. As a result, the energy saving effect is impaired.

SUMMARY OF THE INVENTION

The first aspect of the present invention discloses an information processing apparatus for managing distributed processing by a plurality of devices which are connected to a computer network and have a power-saving mode, comprising:

a retriever, arranged to retrieve device information and operation states of the plurality of devices; and a selector, arranged to select target devices of the distributed processing based on at least one of the device information and operation states.

The second aspect of the present invention discloses an information processing apparatus for managing distributed processing by a plurality of devices which are connected to a computer network and have a power-saving mode, comprising:

a retriever, arranged to retrieve device information and operation states of the plurality of devices; and a setter, arranged to set distributed processing amounts to be distributed to the plurality of devices based on at least one of the device information and operation states.

According to the present invention, distributed processing which takes the power-saving mode of devices and shifts to the power-saving mode can be implemented.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 shows a table used to manage job processing amounts so as to distribute divided jobs to the printers in the states shown in FIG. 9.

DESCRIPTION OF THE PREFERRED EMBODIMENTS

Preferred embodiments of the present invention will be described in detail hereinafter with reference to the accompanying drawings.

First Embodiment

Printer

Figure 1:
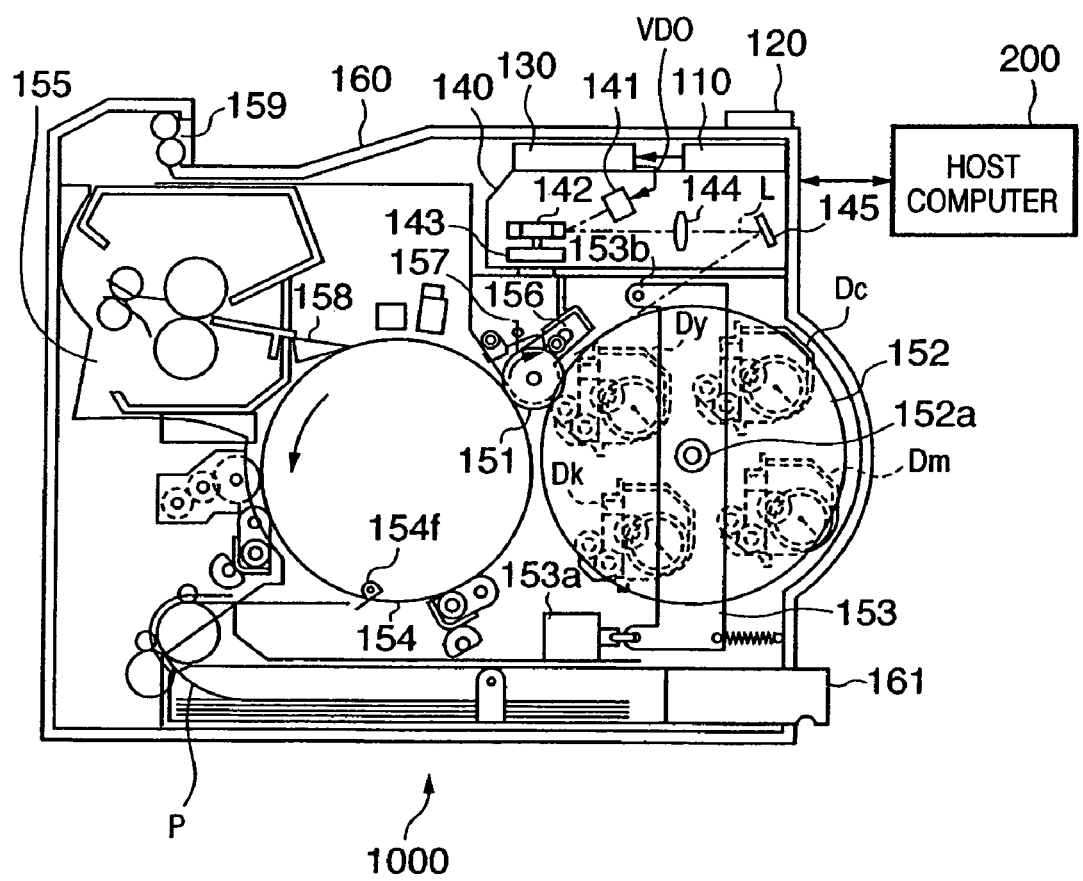
FIG. 1 is a sectional view showing the structure of a printer.

FIG. 1 shows the structure of a printer 1000 according to this embodiment. Note that this embodiment can be applied to a network environment to which a plurality of multi-functional peripheral equipments (MFPs), copying machines, and laser beam and ink-jet printers are connected. A color laser beam printer (to be simply referred to as a "printer" hereinafter) will be exemplified below as a typical printer. The printer 1000 shown in FIG. 1 prints an image at a print density of 600 dpi on the basis of multi-valued data which expresses pixels of respective color components by 8-bit grayscale.

Referring to FIG. 1, the printer 1000 receives and stores a print command, which is supplied from an externally connected host computer 200 and includes print data (character codes, image data, page description language (PDL) data, and the like) and a control code. The printer 1000 forms a character pattern, image, or the like in accordance with the received print command, and forms a color visible image on a print sheet. A formatter controller 110 interprets the print command supplied from the host computer 200 to execute generation processing of a print image, and controls the overall printer 1000. The formatter controller 110 is connected to an operation panel 120. The operation panel 120 has switches, an LCD display, and the like which are used to receive a user's operation/instruction and to inform the user of the status of the printer 1000. The operation panel 120 is mounted as, e.g., a part of a housing of the printer 1000.

An output controller 130 reads out the final print image generated by the formatter controller 110 as a video signal VDO. The output controller 130 receives state signals from various sensors (not shown) arranged in respective units of the printer 1000, and outputs control signals to an optical unit 140 and various drive system mechanisms so as to control and execute print processing.

A print sheet P fed from a paper feed cassette 161 is held on the outer surface of a transfer drum 154 while its leading end is gripped by a gripper 154f. Electrostatic latent images of an image, which is color-separated into four colors, are formed on a photosensitive drum 151 in the order of yellow (Y), magenta (M), cyan (C), and black (Bk) by a laser beam output from the optical unit 140. The electrostatic latent image of each color is developed with toner by a corresponding developer Dy, Dm, Dc, or Dk in a developer selection mechanism 152. Toner images as the development results are overlaid and transferred onto the print sheet P on the transfer drum 154, thus forming a multi-color image on the print sheet P.

After that, the print sheet P is separated from the transfer drum 154, and is conveyed to a fixing unit 155. The print sheet P on which the toner images are fixed by heat and pressure by the fixing unit 155 is exhausted onto an exhaust tray 160 by an exhaust unit 159.

Note that the developers Dy, Dm, Dc, and Dk of respective colors have rotation support shafts at their two ends, and are held by the developer selection mechanism 152 to be rotatable about these shafts. With this mechanism, each developer can maintain its posture constant even when the developer selection mechanism 152 rotates about its rotation shaft 152a to select the developer, as shown in FIG. 1. After the selected developer moves to the developing position, a selection mechanism holding frame 153 having a fulcrum 153b is pulled by a solenoid 153a toward the photosensitive drum 151, and the developer selection mechanism 152 moves toward the photosensitive drum 151, thus performing the developing processing.

The formatter controller 110 renders the print command to device-dependent bitmap data. The output controller 130 reads out a video signal VDO corresponding to the bitmap data from the formatter controller 110. This video signal is input to a laser driver 141 to drive a semiconductor laser element. A laser beam L output from the semiconductor laser element is controlled to be turned on/off in accordance with the video signal VDO. The laser beam L is reflected by a polygonal mirror 142, which is rotated at high speed by a scanner motor 143, and then scans and exposes the surface of the photosensitive drum 151, which is uniformly charged to a predetermined polarity by a charger 156, via an f-θ lens 144 and reflecting mirror 145. As a result, an electrostatic latent image corresponding to the video signal VDO is formed on the photosensitive drum 151.

Next, an M electrostatic latent image is developed by the M developer Dm, and a first toner image of M is formed on the photosensitive drum 151. On the other hand, a print sheet P is fed from the paper feed cassette 161 at a predetermined timing. A transfer bias voltage having a polarity (e.g., plus polarity) opposite to toner is applied to the transfer drum 154 to electrostatically attract the print sheet P on the surface of the transfer drum 154, and the first toner image on the photosensitive drum 151 is transferred onto the print sheet P. After the toner image is transferred, the residual toner on the photosensitive drum 151 is removed by a cleaner 157 to prepare for latent image formation and development of the next color.

In the same sequence, scan exposure of electrostatic latent images of the second, third, and fourth colors, and development and transfer of toner images are done in the order of C, Y, and Bk. Upon transferring the second, third, and fourth colors, a bias voltage higher than the previous formation is applied to the transfer drum 154 unlike the transfer of the first color.

When the leading end of the print sheet P on which the toner images of four colors have been overlaid and transferred approaches the separation position, a separation pawl 158 comes closer, and the leading end of the separation pawl 158 contacts the surface of the transfer drum 154 to separate the print sheet P from the transfer drum 154. The separated print sheet P is conveyed to the fixing unit 155 to fix the toner images on the print sheet, and is then exhausted onto the exhaust tray 160.

The printer 1000 outputs an image at a resolution of 600 dpi via the aforementioned image formation process. Note that a printer which can be used as that of this embodiment is not limited to the color laser beam printer. Alternatively, color printers of other schemes such as an ink-jet printer, thermal printer, and the like may be used, or a monochrome printer may be used.

[Printing System]

Figure 2:
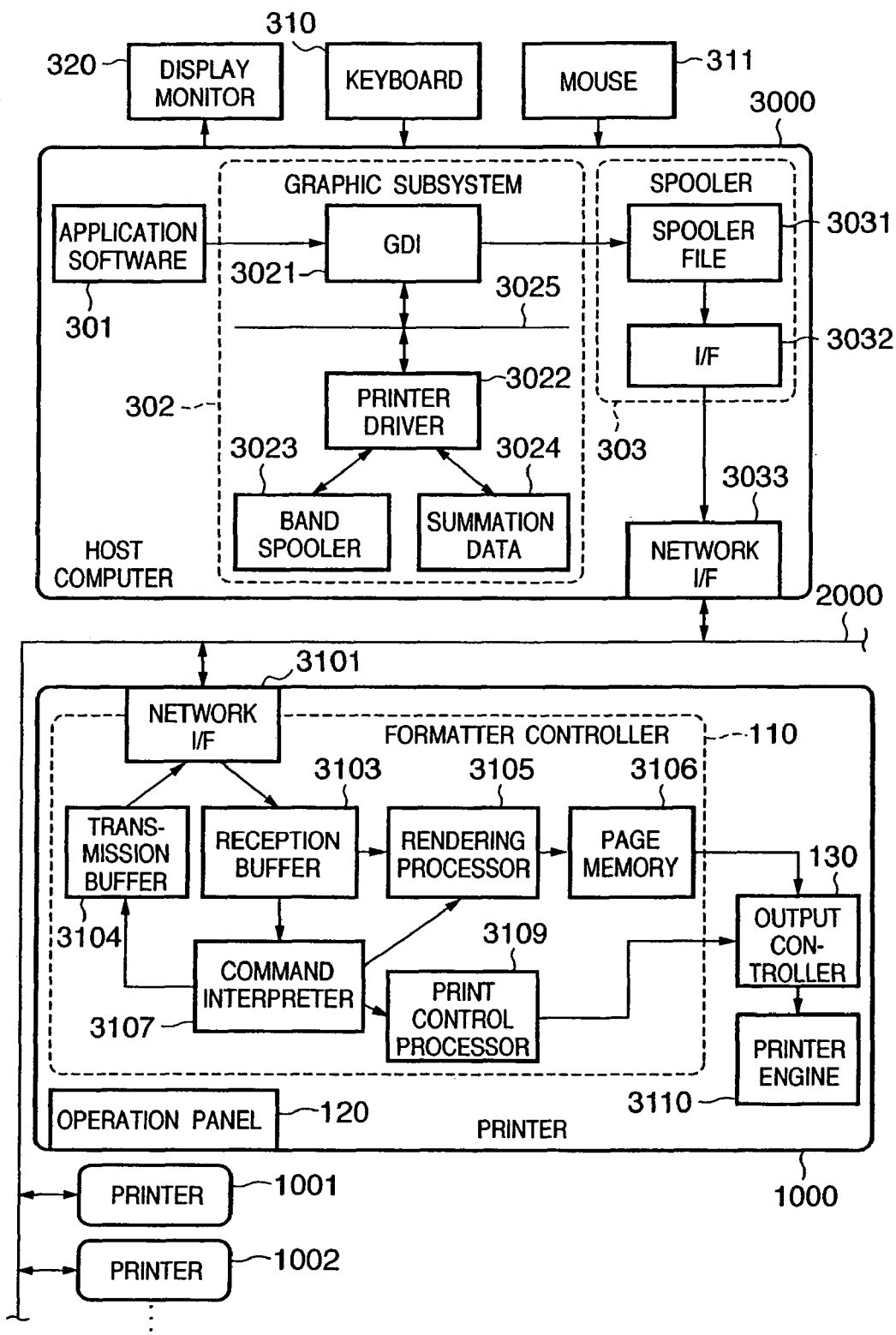
FIG. 2 is a block diagram showing the arrangement of a printing system.

FIG. 2 is a block diagram showing the arrangement of the printing system of this embodiment. The printing system has an arrangement in which a host computer 3000 and a plurality of printers 1000, 1001, 1002, . . . are connected to each other via a communication path 2000. Note that FIG. 2 illustrates three printers, but the number of printers is not limited.

Formatter Controller

The formatter controller 110 is also called a PDL controller or the like. The formatter controller 110 comprises a network interface (I/F) 3101 for making communications with the host computer 3000 or the like, a reception buffer 3103 for temporarily holding reception data and the like, and a transmission buffer 3104 for temporarily holding transmission data and the like. Also, the formatter controller 110 comprises a command interpreter 3107 for interpreting print data, a print control processor 3109 for executing print control processing, a rendering processor 3105 for executing rendering processing, a page memory 3106, and the like.

The network I/F 3101 exchanges print data with the host computer 3000 or the like. An arbitrary connection method between the host computer 3000 and printer may be adopted. For example, a connection which allows a communication compliant to, e.g., IEEE1284 as a communication protocol via a computer network such as a LAN or the like may be used. Also, a connection via a serial bus such as Universal Serial Bus (USB), IEEE1394, or the like may be used. Of course, infrared rays or radio may be used as the communication path 2000.

Print data received by the network I/F 3101 is sequentially stored in the reception buffer 3103, and is read out and processed by the command interpreter 3107 or rendering processor 3105 as needed. The command interpreter 3107 is implemented by a control program according to a print command system and print job control language. When a command pertains to rendering of text, graphic, image, or the like, the command interpreter 3107 issues its processing instruction to the rendering processor 3105. When a command pertains to processing other than rendering such as a paper select command, reset command, or the like, the command interpreter 3107 issues its processing instruction to the print control processor 3109.

The rendering processor 3105 is a YMCK renderer which sequentially renders respective rendering objects of characters and images on a band memory in the page memory 3106. In case of the color laser beam printer shown in FIG. 2, device-dependent bitmap data must be sent to a printer engine 3110 in the order of M, C, Y, and K. However, the memory capacity required for all these data is not always assured in a default state. That is, the rendering processor 3105 assures a memory area with a size of a fraction of one plane (1, 2, or 4 bits/pixel) as a band memory in the page memory 3106. The rendering processor 3105 then executes the rendering processing synchronized with the processing of the printer engine 3110 by repetitively using the band memory. Note that the printer engine 3110 is a generic name of the overall arrangement which includes the optical unit 140, photosensitive drum 151, developer selection mechanism 152, transfer drum 154, fixing unit 155, and the like shown in FIG. 1, and executes the aforementioned image formation process.

Normally, the page memory 3106 is managed by banding control in which shipping processing of a video signal to the printer engine 3110 pursues the rendering processing of the rendering processor 3105. However, if a sufficient memory capacity is available, a memory area on which bitmap data for one page can be mapped may be assured.

In general, the formatter controller 110 is implemented when a computer system that uses a CPU, ROM, RAM, and the like executes a control/processing program for a formatter controller. Processes of respective units in the formatter controller 110 may be processed by time sharing based on a multi-task monitor (realtime OS), or dedicated controller hardware components may be prepared for respective functions to independently execute these processes.

The operation panel 120 receives user's operations/instructions and notifies the user of the status of the printer 1000, as described above. An output controller 3108 converts bitmap data rendered on the band memory (page memory) 3106 into a video signal, and transfers the video signal to the printer engine 3110. The printer engine 3110 forms a visible image on a print sheet based on the received video signal.

Host Computer

The host computer 3000 outputs print data including print data and a control code to the printer 1000. The host computer 3000 is configured as one computer system to which a keyboard 310 and mouse 311 as input devices, and a display monitor 320 as a display device are connected. Note that the host computer 3000 is hardware which comprises a CPU, ROM, RAM, hard disk drive (HDD), various input/output controllers (I/Os), and the like. The host computer 3000 is controlled by basic software (OS) such as Windows® or the like and respective application software programs and subsystem processes serve as functional modules under the control of that basic software.

Paying attention to only functions that pertain to this embodiment, the functional modules of the host computer 3000 are classified into application software 301, a graphic subsystem 302, spooler 303, and network interface 3033 which communicates with the printer. The application software 301 is general application software such as a wordprocessor, spreadsheet, or the like, which runs on the OS and is used to create documents.

The graphic subsystem 302 comprises a Graphic Device Interface (GDI) 3021, a printer driver 3022 as a device driver, and a band spooler 3023 and summation data 3024, which are stored on a predetermined area of the RAM. The GDI 3021 is a part of functions of the OS, and the printer driver 3022, band spooler 302, and summation data 3024 are dynamically linked from the GDI 3021. The printer driver 3022 is called from the GDI 3021 via a Device Driver Interface (DDI) 3025, and executes processing depending on the printer for respective rendering objects. The host computer 3000 according to this embodiment includes two different types of processing. In the first processing, information passed to the DDI function is converted into a print command data (PDL) format that can be processed by the printer at high speed, and the converted data is directly output to the spooler 303. In the second processing, generated print command data is divided into bands and is held on the band spooler 3023 for one page in turn from the first band, and the held band data are output to the spooler 303 together at the end of the page.

The spooler 303 is a spool file system managed by the OS. The spooler 303 stores print data for one page or job depending on settings as a spool file 3031 (its storage area is assigned to the HDD), and transmits the spool file to the printer via an I/F 3032 and the network I/F 3033.

The names of the aforementioned units and functional framework may be slightly different depending on the OS, but such differences of names and framework do not influence the gist of this embodiment. For example, a module called a spooler or spool file in this embodiment can be implemented using a module called a print queue in another OS.

Processing of Printer Driver

Figure 3:
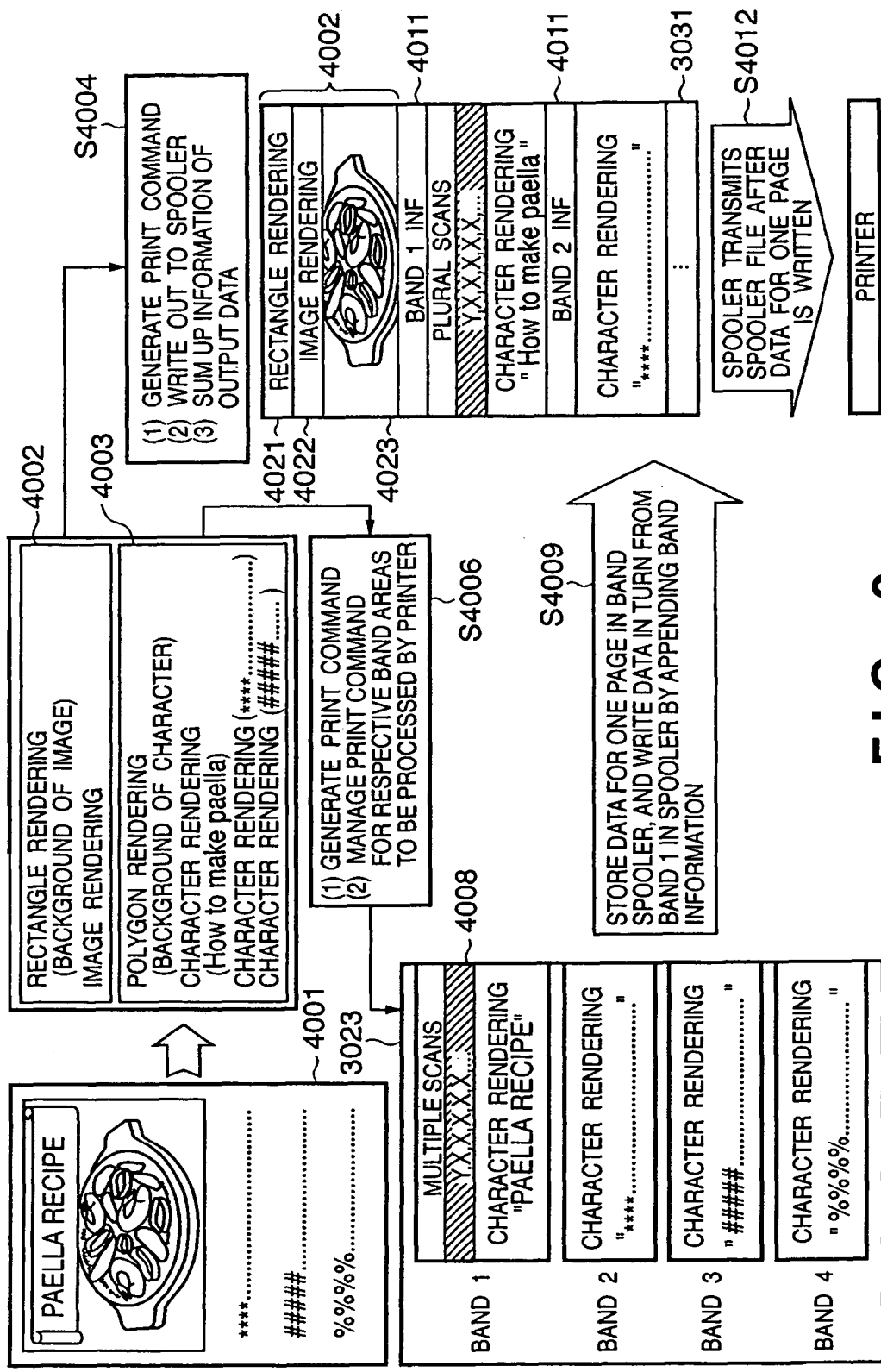
FIG. 3 is a view illustrating an overview of processing of a printer driver.

FIG. 3 shows an overview of the processing of the printer driver 3022. Assume that a document 4001 created using a general document creation application includes graphics, text, and image data.

Upon printing the document 4001, rendering commands 4002 and 4003 are passed to the printer driver 3022 via the OS. In a default state, the printer driver 3022 generates print commands (PDL) for respective rendering commands as in a normal PDL mode-based driver. The printer driver 3022 writes them in the spooler 303, and sums up the data sizes calculated by a predetermined calculation formula in accordance with the number and types of commands as summation data 3024 (S4004). Note that the rendering commands (DDI functions) received by the printer driver 3022 via the OS are output in turn from lower layers of a stack of rendering objects. When all data for one page are written, the spooler 303 transmits the print commands (PDL) stored as the spool file 3031 and the summation data 3024 to a task manager (to be described later). The spooler 303 clears the spool file 3031, and instructs the printer driver 3023 to clear the summation data 3024 (step S4012).

On the other hand, when the value of the summation data 3024 exceeds a predetermined data size, the number of commands, or the like, the processing for each page is switched to that for respective bands, which will be described below. Assume that rendering objects up to "rectangle rendering (background of image)" 4021, "image rendering" 4022, and "entity of image (image data)" 4023 shown in FIG. 3 are stored in the spooler 303. The processing for each page is switched to that for respective bands at the timing when the summation data 3024 exceeds a threshold of the predetermined data size at the timing when the "entity of image" 4023 is output to the spooler 303.

Upon switching to the processing for respective bands at the above timing, the printer driver 3022 generates print commands for rendering commands 4003 after the "entity of image" 4023. The printer driver 3022 separately stores and manages the print commands in the band spooler 3023 in the rendering order for respective band areas to be processed by the printer (S4006). The rendering commands 4003 (DDI functions) passed from the OS are output irrespective of the print direction of the printer. For this reason, even when the processing for respective bands is switched from the middle of a page as in this embodiment, storage processing for all bands (first to N-th bands) in the page is done.

The storage processing is executed every time the DDI function in the printer driver 3022 is called. If the storage area assured for the processing for respective bands becomes full of data, a new area is assured on the RAM. Upon completion of storage of rendering data from the first to N-th bands, which correspond to the remaining data of one page, data are written out onto the spooler 3003 in the order of bands to be processed by the printer, and the band spooler 3023 is cleared (S4009).

Information (Band N inf) 4011 of next band data to be output is appended to the head of each band data, thus making the printer recognize that the print data is switched from the page unit to the band unit. When print data for one page is written, the spooler 303 transmits the spool file 3031 and summation data 3024 to a task manager (to be described later). The spooler 303 clears the spool file 3031, and instructs the printer driver 3022 to clear the summation data 3024 (S4012).

Hardware Arrangement of Printer

Figure 4:
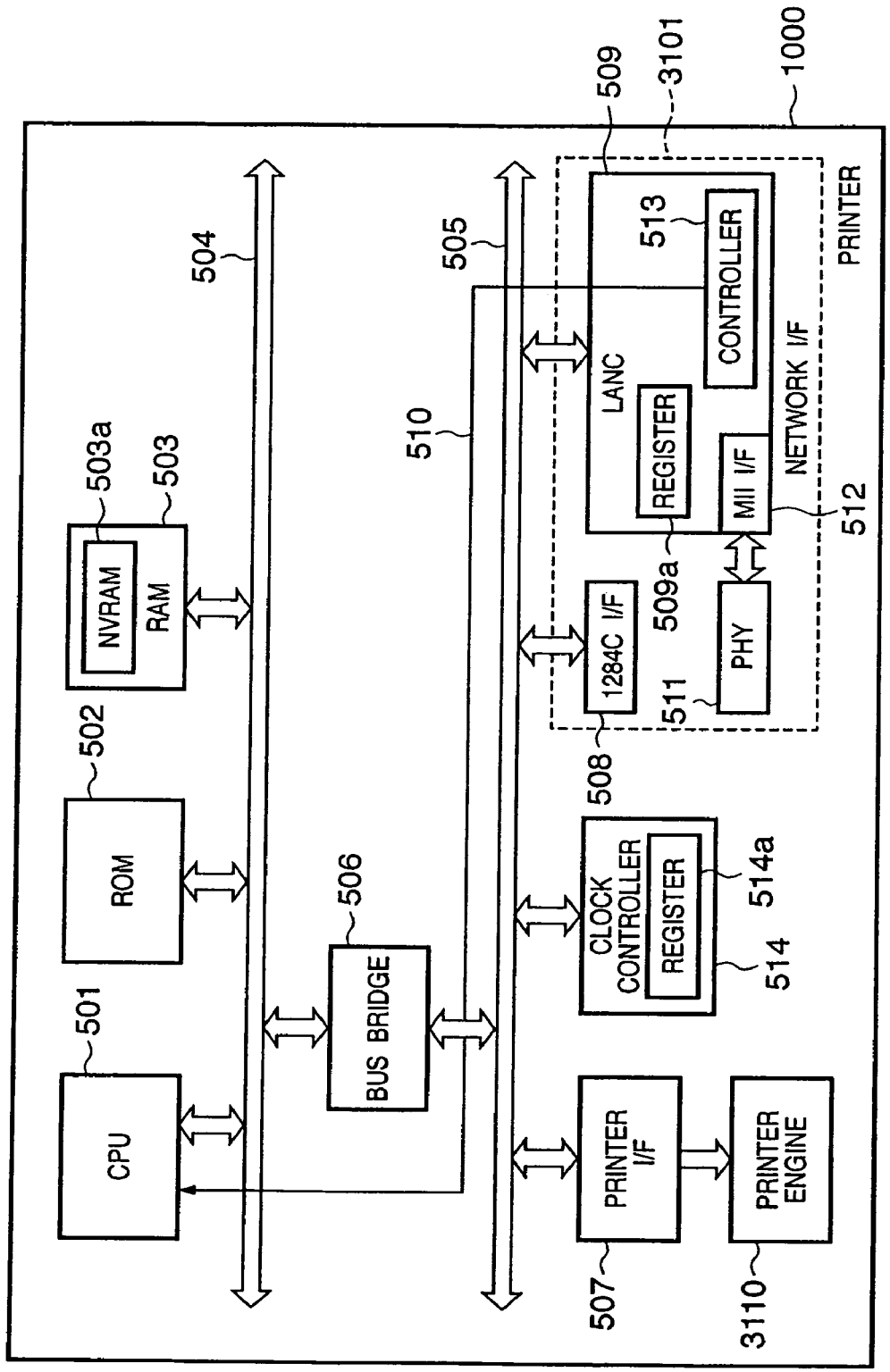
FIG. 4 is a block diagram showing the hardware arrangement of the printer.

FIG. 4 shows the hardware arrangement of the printer.

A CPU 501 of the printer executes control of the overall printer, arithmetic processing including an image process, and the like in accordance with control/processing programs stored in a ROM 502 using a RAM 503 as a work memory. The ROM 502 stores the control/processing programs and the like. The CPU 501 operates by reading out and executing the programs from the ROM 502. The RAM 503 is used as the reception buffer 3103 and transmission buffer 3104 for temporarily storing reception/transmission data with the network 2000, and the page memory 3106 for temporarily storing rendered image data. The RAM 503 is also used as a work memory for temporarily saving data required for arithmetic operations of the CPU 501, and the like. By combining these CPU 501, ROM 502, and RAM 503, the formatter controller 110 and the like are implemented.

The CPU 501, ROM 502, and RAM 503 are connected to each other via a system bus 504, and are also connected to an extended bus 505 via a bus bridge 506. The system bus 504 and extended bus 505 are independently operable due to the presence of the bus bridge 506. A printer I/F 507 transfers image data stored in the RAM 503 and the like to the printer engine 3110.

The network I/F 3101 comprises an IEEE1284 I/F 508 as a Bicentronics interface, and a network controller (LANC) 509. A PHY 511 is a physical transceiver used to connect the network 2000. An MII I/F 512 is an interface used to connect the LANC 509 to the PHY 511, and makes handshake data transfer with the PHY 511. An internal controller 513 of the LANC 509 performs control in the LANC 509 and control of external communications. The controller 513 can send an interrupt to the CPU 501 via a dedicated signal line 510, and can notify the CPU 501 of end of data transmission/reception with the network 2000. When a data packet is received from another device on the network 2000 and a specific bit pattern is detected from that data packet (to be referred to as "reception of a specific packet" hereinafter), the controller 513 sends to the CPU 501 an interrupt that advises accordingly. Note that the specific packet includes a Magic Packet and a packet indicating start of distributed processing to be described later, and bit patterns of these packets are held in advance in the controller 513. Note that the bit pattern of the packet indicating start of distributed processing is set in advance between the host computer and printer. In this embodiment, the packet which has the specific bit pattern indicating start of distributed processing is called a "Grid packet".

A clock controller 514 distributes clocks to the respective modules via a clock supply line (not shown). The clock controller 514 can control clocks to be supplied to some modules in accordance with the value of a register 514a which can be set by the CPU 501. The clock control includes clock stop control, cancel control of clock stop, clock down control for setting the frequency of clocks lower than a normal operation state, clock up control for restoring the frequency of clocks to that of the normal operation, and the like.

Distributed Processing

Figure 5:
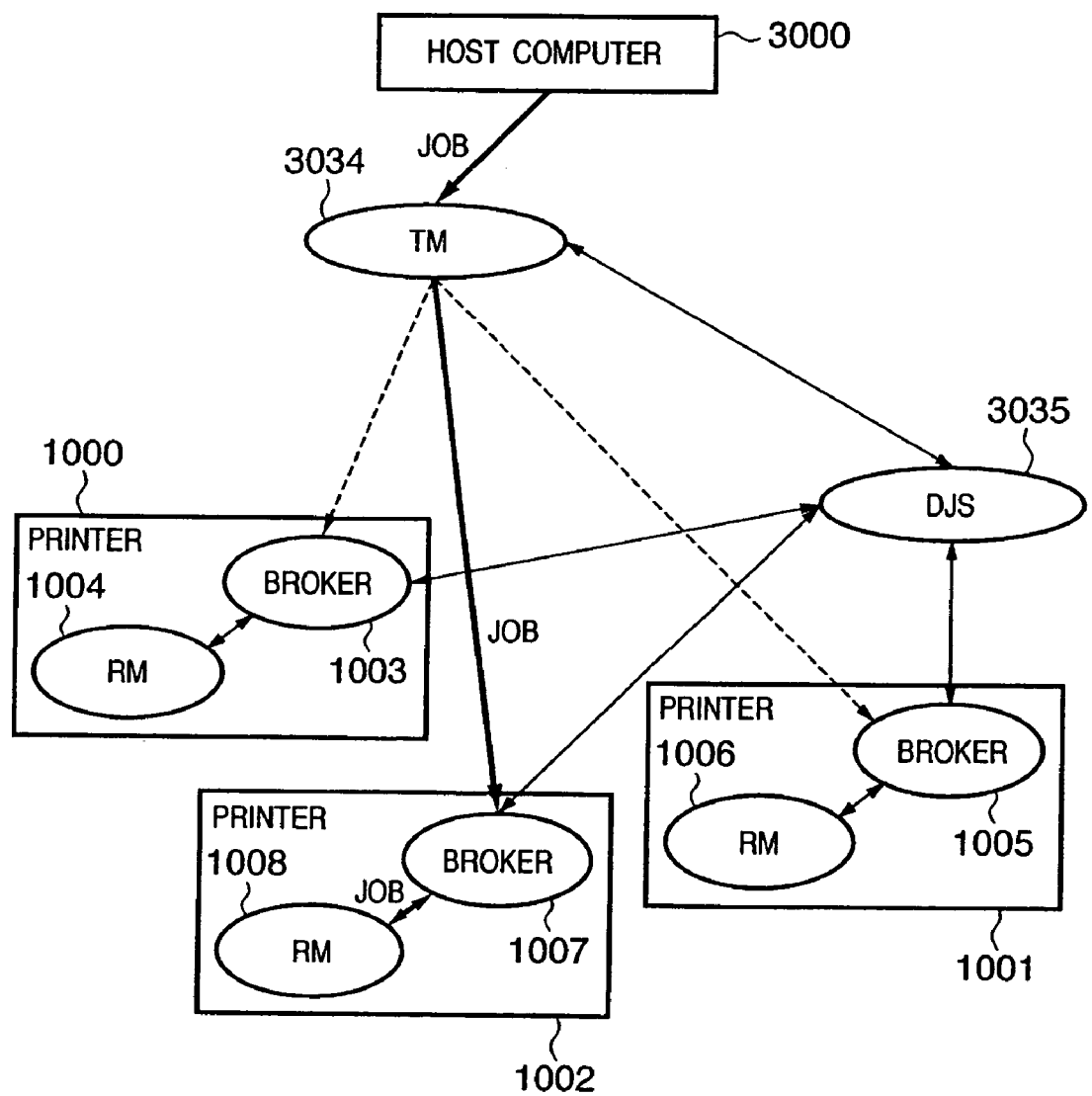
FIG. 5 is a chart for explaining distributed processing of the printing system.

FIG. 5 is a chart for explaining the distributed processing of the printing system. In the following description, a task manager (TM) 3034 and dynamic job scheduler (DJS) 3035 are implemented by software installed on basic software which is executed by the CPU of the host computer 3000. Also, a broker and resource manager (RM) are implemented by software installed on basic software which is executed by the CPU of each printer.

The host computer 3000 starts processing of a job. In this embodiment, the job means a print operation. Upon reception of the job, the TM 3034 sends a job request to the DJS 3035 so as to request it to interpret the job, and receives the interpretation result (including a message indicating an optimal broker or brokers) from the DJS 3035. Based on the interpretation result, the TM 3034 enters the job to brokers 1003, 1005, and/or 1007 (FIG. 5 shows a state wherein the job is input to the broker 1007 of the printer 1002). Note that the DJS 3035 periodically inquires the status of each broker to keep track the situation of the resource (idle state of the printer) and that of the entire printing system, thus selecting an optimal broker or brokers. Note that the DJS 3035 also decides if the job is to be processed by hardware or software.

The brokers 1003, 1005, and 1007 of the printers retrieve the idle states of the resources and the like from the RMs 1004, 1006, and 1008 in the identical printers, and register them in the DJS 3035. When the TM 3034 enters a job to each broker, the broker searches for an optimal resource, enters the job to that resource via the RM, and sends a job completion message (and processing result) from the RM to the TM 3034. If the resource suffers any abnormality, each RM advises the broker of the identical printer accordingly. Note that the abnormality corresponds to a case wherein a job is entered from another client, and a job to be entered or the entered job from the TM 3034 cannot be continuously processed.

Figure 6:
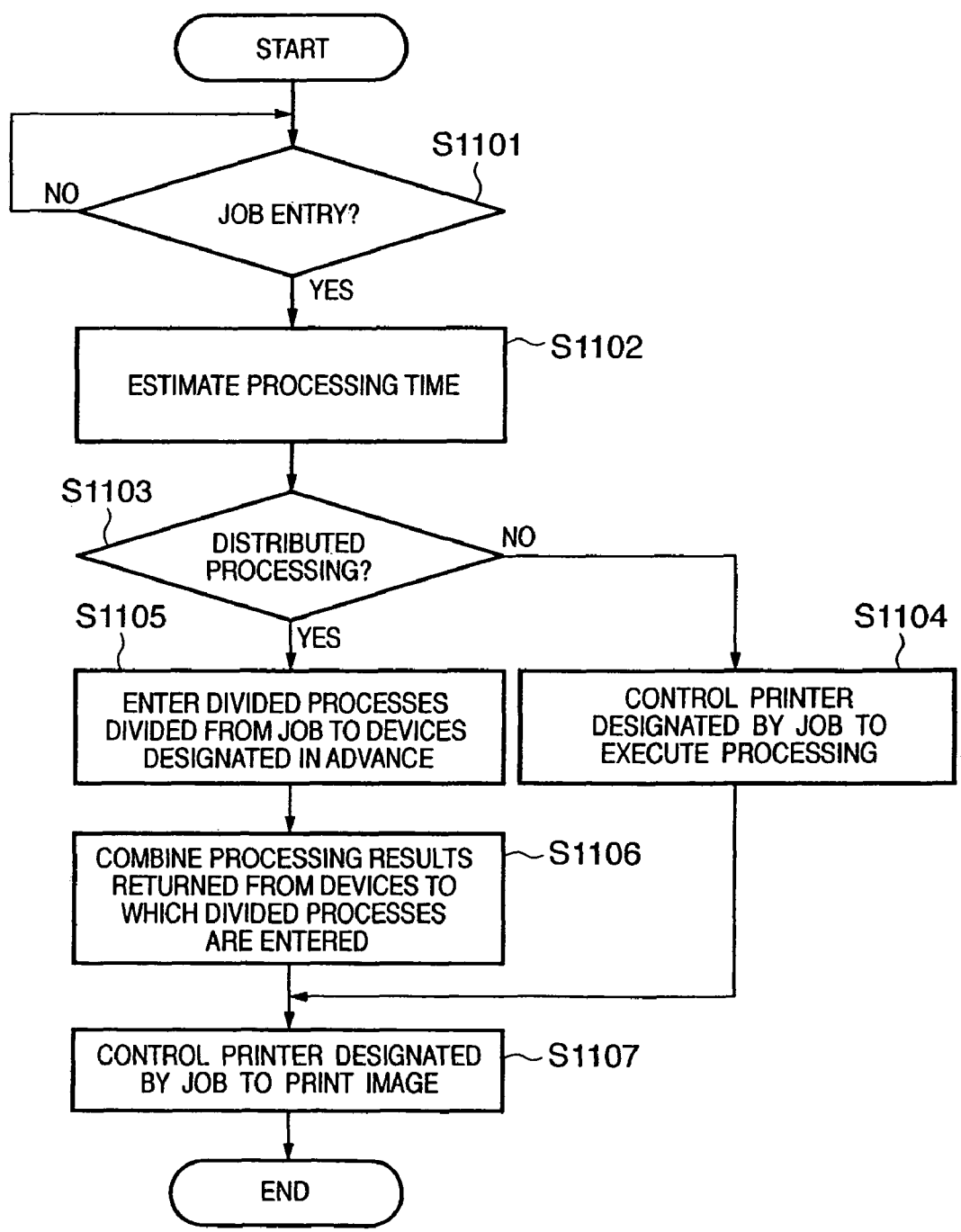
FIG. 6 is a flowchart showing processing of a TM.

FIG. 6 is a flowchart showing the processing of the TM 3034.

The TM 3034 waits for entry of a job (S1101). If a job is entered, the TM 3034 estimates its processing time (S1102). The processing time can be estimated from the aforementioned summation data 3024.

The TM 3034 checks based on the estimation result of the processing time if the distributed processing is to be executed (S1103). If it is determined that the processing time can be shortened when the distributed processing is executed, the TM 3034 divides a job and enters divided jobs to devices designated in advance (S1105). As a method of dividing a job, the job may be divided for respective bands or pages. Of course, divided jobs may be distributed and entered to a plurality of devices. Alternatively, if the processing time can be shortened when an arbitrary device executes all processes, the whole job may be input to that device.

Since the DJS 3035 periodically inquires the broker 1007 installed in the printer 1002 and the like connected to the network of status, it recognizes the states of resources (idle information of printers) connected to the network. The DJS 3035 internally holds the recognized information. For this reason, upon designating devices, the TM 3034 selects idle devices based on the resource information on the network held by the DJS 3035 and can enter jobs to them.

The TM 3034 combines the processing results (image data which are rendered and converted into bitmap data in this case) returned from the devices to which the divided processes are entered (S1106), and instructs the printer designated by the job to print the combined image (S1107), thus ending the job. Of course, when the whole job is entered to a single device, the processing results need not be combined.

If the TM 3034 determines in step S1103 that:

the processing time can be shortened when the printer designated by the job processes the job, speeding up of processing cannot be expected since resources of the devices designated in advance are processing another job although the processing time can be shortened by the distributed processing, or the job is relatively light and can be sufficiently processed by the processing speed of the designated printer, it instructs the printer designated by the job to execute the processing (rendering and conversion into bitmap data) (S1104) and printing of an image (S1107), thus ending the job.

Assume that the TM 3034 enters divided processes to the printer 1000 in this case. To a distributed processing start instruction by the TM 3034, the broker 1003 which runs on the CPU 501 of the printer 1000 responds, and the RM 1004 which similarly runs on the CPU 501 responds next. The broker 1003 returns a message indicating that it can receive the divided processes, and the status of the resource of the printer 1000 to the TM 3034. In response to this reply, the TM 3034 transmits the divided processes to the broker 1003.

Selection of Devices to which Distributed Processing is Assigned

Device selection of distributed processing in consideration of the power-saving mode will be exemplified below. Note that the printers to be described below can arbitrarily set an unused time period until the power-saving mode starts.

Figure 7:
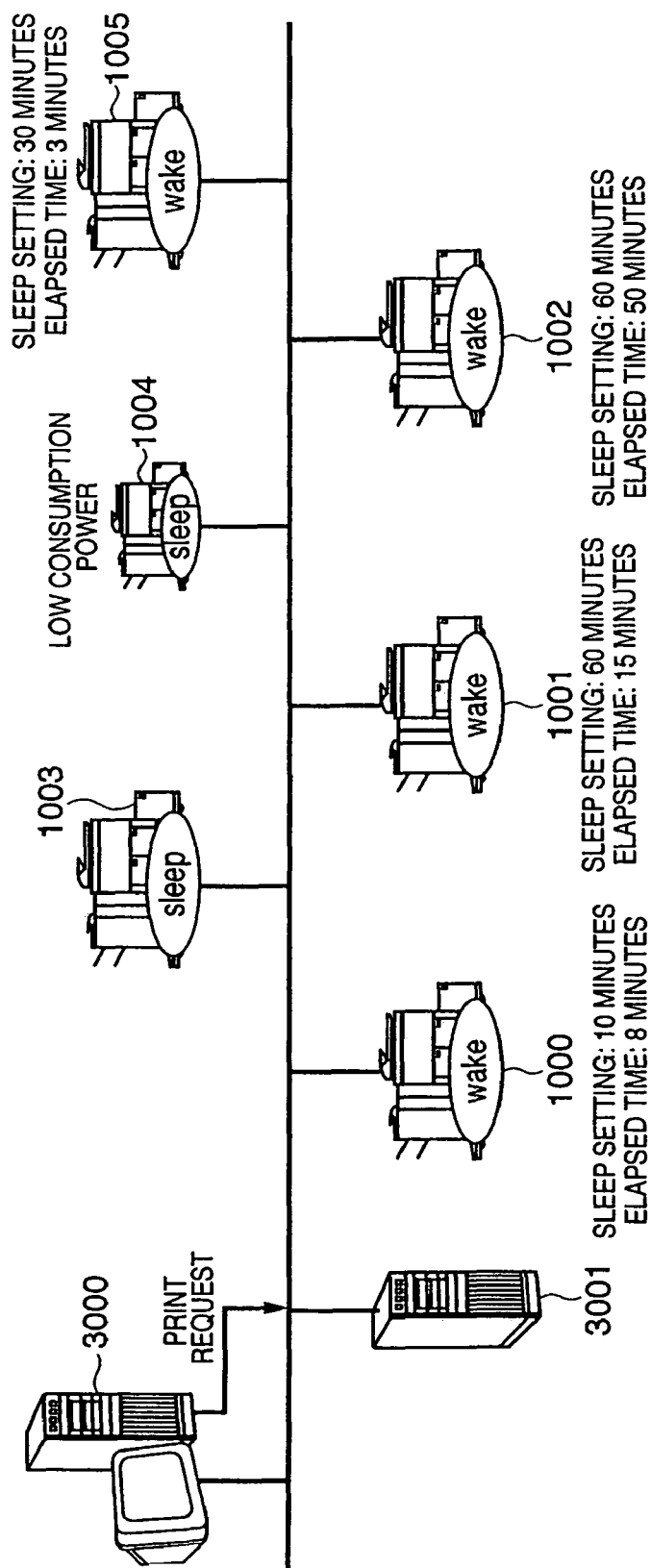
FIG. 7 is a view showing printer states and a state in which a job is entered from a client PC.

FIG. 7 is a view showing the states of printers 1000 to 1005 and a state in which a job is entered from the client PC (host computer) 3000. Note that "wake" appended to each printer indicates an active state of that printer, and "sleep" indicates a sleep state (power-saving mode) of that printer.

The printer 1000 is set to shift to the power-saving mode (sleep state) when an inactive state continues for 10 minutes (sleep setting: 10 minutes), and eight minutes have elapsed in an unused state. If an unused state continues for the next two minutes, the printer 1000 will shift to the power-saving mode.

The printer 1001 has a printer setting of 60 minutes, and 15 minutes have elapse in an unused state. Therefore, the printer 1001 requires 45 minutes until it will shift to the power-saving mode, and is set under the same condition as the present state if an unused state continues for 15 minutes even when the printer 1002 is used to process a job now.

The printer 1002 has a printer setting of 60 minutes, and 50 minutes have elapsed in an unused state. Therefore, if an inactive state continues for the next 10 minutes, the printer 1002 will shift to the power-saving mode. However, if the printer 1002 is used to process a job, it is not set under the same condition as the present state unless an unused state continues for 50 minutes again.

The printers 1003 and 1004 have already shifted to the power-saving mode. However, assume that the printer 1004 is a printer such as a low-speed machine, which has consumption power sufficiently lower than other printers in a normal active state.

The printer 1005 has a sleep setting of 30 minutes, and three minutes have elapse in an unused state. Therefore, the printer 1005 requires 27 minutes until it will shift to the power-saving mode, and is set under the same condition as the present state if an unused state continues for 3 minutes even when the printer 1005 is used to process a job now.

The DJS 3035 which runs on a server 3001 retrieves the aforementioned device information of the printers.

Figure 8:
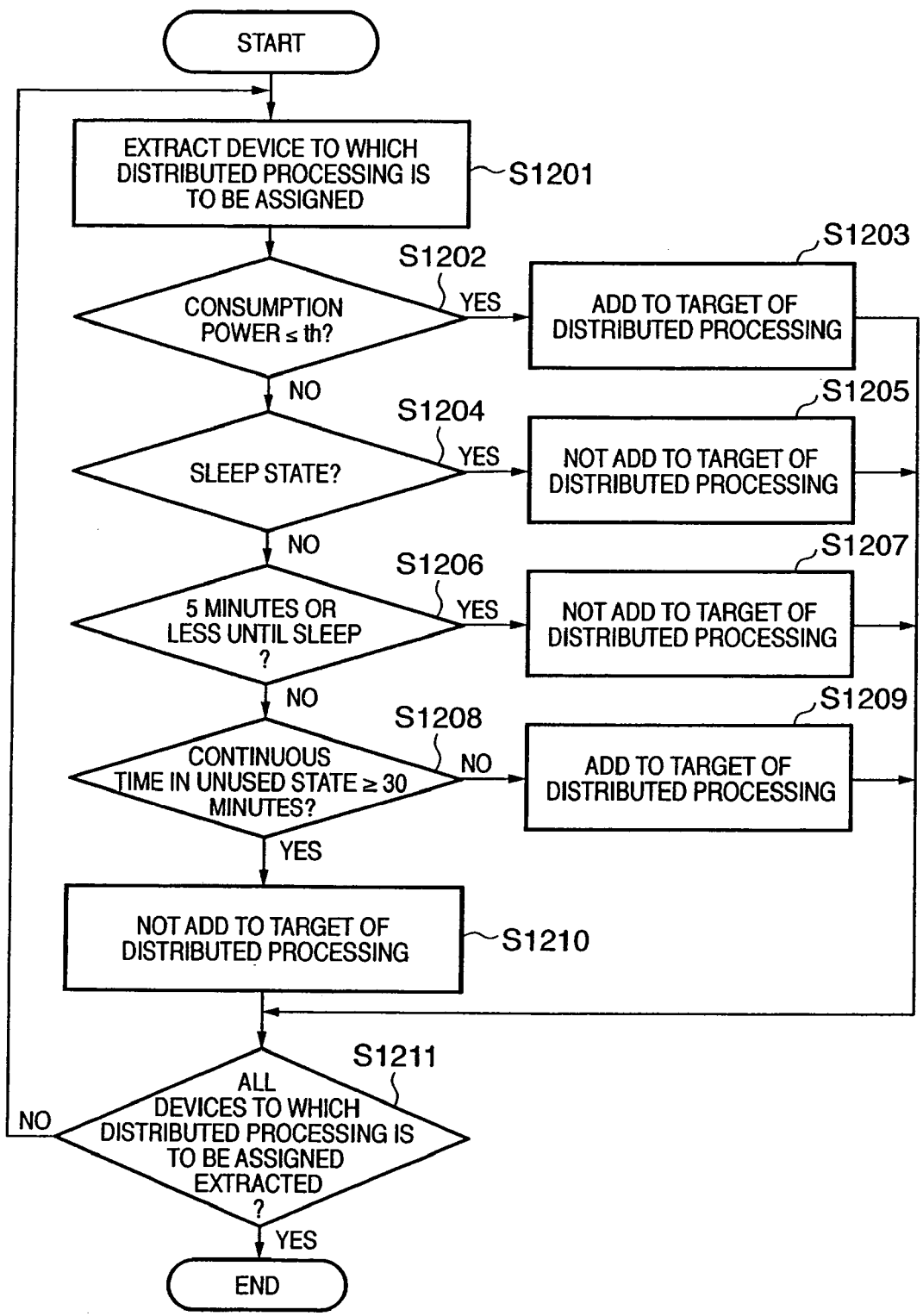
FIG. 8 is a flowchart showing selection of devices to which distributed processing is to be assigned.

FIG. 8 is a flowchart showing selection of devices to which distributed processing is to be assigned. This processing is executed by the DJS 3035.

The DJS 3035 extracts one device to which the distributed processing is to be assigned (S1201), and checks if the consumption power of that device in a normal operation is equal to or lower than a threshold th (S1202). That is, if the consumption power is equal to or lower than the threshold th, that device has less influence on power saving if it is used in the distributed processing. In the example of FIG. 7, the consumption power of the printer 1004 is less than the threshold th. Therefore, the DJS 3025 adds the device which has the consumption power equal to or lower than the threshold th to a target of the distributed processing (S1203).

In case of a device whose consumption power exceeds the threshold th, the DJS 3035 checks if that device is now in the power-saving mode (S1204). If that device is in the power-saving mode, the DJS 3035 does not add it to a target of the distributed processing so as to maintain the power-saving mode (S1205). The printer 1003 in FIG. 7 corresponds to such device.

In case of a device which is not in the power-saving mode, the DJS 3035 checks based on the sleep setting time and the continuous time of an unused state of that device if that device is to be added to a target of the distributed processing.

The DJS 3035 checks first if the time until the power-saving mode starts is 5 minutes or less (S1206). For example, since the printer 1000 shown in FIG. 7 will shift to the power-saving mode in two more minutes, it is determined as a device just before shift, and is not added to a target of the distributed processing (S1207).

Since 45 minutes remain until the printer 1001 shown in FIG. 7 will shift to the power-saving mode, this printer is not determined as a device just before shift, and it is then checked if a continuous time in an unused state is 30 minutes or more (S1208). Since the continuous time in an unused state of the printer 1001 is 15 minutes, it is determined that not so long a time is required until this printer returns to the current continuous time if it processes a job, and this printer is added to a target of the distributed processing (S1209).

Since 10 minutes remain until the printer 1002 shown in FIG. 7 will shift to the power-saving mode, this printer is not determined as a device just before shift, and the continuous time in an unused state is then checked (S1208). Since the continuous time in an unused state of the printer 1002 is 50 minutes which are 30 minutes or more, it is determined that a long time is required until the printer returns to the current continuous time, and this printer is not added to a target of the distributed processing (S1210).

Twenty-seven minutes remain until the printer 1005 will shift to the power-saving mode, and the continuous time in an unused state is 3 minutes. Therefore, this printer is not determined as a device just before shift, and it is determined that not so long a time is required until this printer returns to the current continuous time if it processes a job. Hence, this printer is added to a target of the distributed processing (S1209).

Note that the processing in FIG. 8 is repeated until it is determined in step S1211 that all devices to which the distributed processing is to be assigned are extracted.

Therefore, when the printers are in the states shown in FIG. 7, the DJS 3035 extracts the three printers, i.e., the printers 1001, 1004, and 1005 as targets of the distributed processing with reference to the device information of these printers. Then, the DJS 3035 sends information indicating the brokers of these printers to the TM 3034 of the client PC 3000 as a request source of the distributed processing. Based on this information, the TM 3034 of the client PC 3000 enters a job such as a print job or the like to these brokers.

In this way, device selection of the distributed processing that considers the power-saving mode can be made. Therefore, a device in the power-saving mode and that just before shift to the power-saving mode are excluded from targets of the distributed processing, thus effectively functioning the power-saving mode. Also, a device which requires small consumption power even in the power-saving mode and that which requires a long time until it will shift to the power-saving mode (not a device just before shift) are positively selected as targets of the distributed processing, thus implementing high-speed processing of the job.

Note that the threshold of the time shown in FIG. 8 is merely an example, and is preferably and appropriately set according to the arrangement of the system shown in FIG. 7. Likewise, the threshold th of the consumption power is preferably set in consideration of the consumption powers of the printers connected to the system so that at least a printer having a minimum consumption power is selected.

Note that the above embodiment has exemplified rendering and conversion into bitmap data as the processing contents. However, the present invention is not limited to such specific processing contents. For example, the aforementioned distributed processing in consideration of the power-saving mode may be applied to various kinds of processing such as color space conversion (color space compression) and the like.

Second Embodiment

Processing according to the second embodiment of the present invention will be described below. The same reference numerals in the second embodiment denote the same parts as in the first embodiment, and a detailed description thereof will be omitted.

Figure 9:
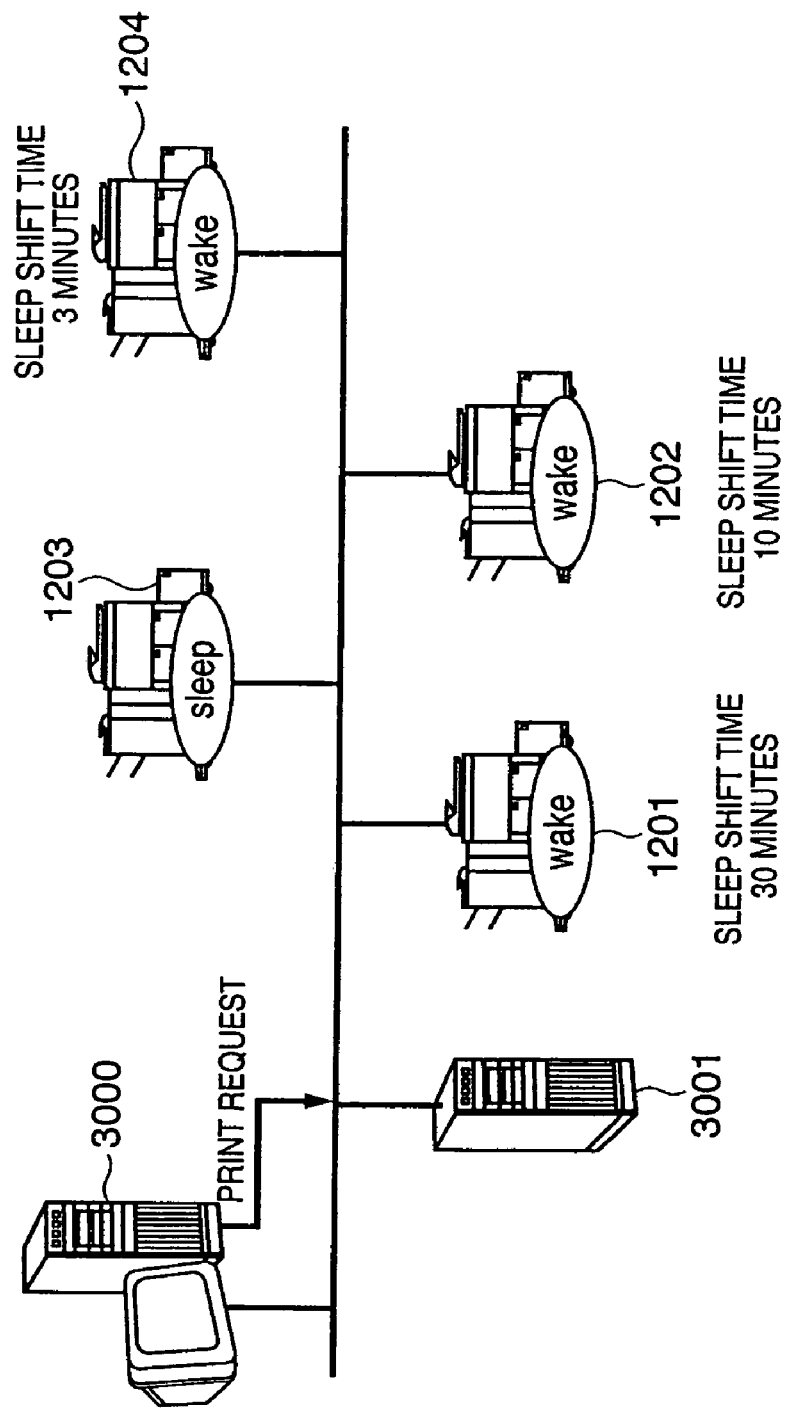
FIG. 9 is a view showing printer states and a state in which a job is entered from a client PC according to the second embodiment.

FIG. 9 is a view showing the states of printers 1201 to 1204 and a state in which a job is entered from the client PC (host computer) 3000.

A time remaining until the printer 1201 will shift to a sleep state (sleep shift time) is 30 minutes. The sleep shift time of the printer 1202 is 10 minutes. The printer 1203 is in the sleep state. The sleep shift time of the printer 1204 is three minutes. The DJS 3035 on the server 3001 retrieves device information of these printers, and selects devices to which distributed processing is to be assigned.

The DJS 3035 estimates a job processing amount to be entered by the client PC 3000, and makes preparation for dividing that job into jobs each having a small processing amount. The DJS 3035 retrieves job processing capacities of the printers 1201 to 1204, and calculates processing times corresponding to the job processing amount. The DJS 3035 calculates job processing amounts which can be processed by the printers 1201, 1202, and 1204 in an active state within times remaining until they shift to the power-saving mode. The DJS 3035 notifies the TM 3034 of the client PC 3000 of the relationship between the printers and job processing amounts (processing amounts of divided jobs). Based on this notification, the TM 3034 distributes the divided jobs to the printers.

FIG. 10 shows a table used to manage job processing amounts so as to distribute divided jobs to the printers in the states shown in FIG. 9. This table is managed by the DJS 3035.

The sleep shift times of the printers 1201, 1202, and 1204 are 30 minutes, 10 minutes, and 3 minutes, and their processing capacities are 13.3, 20, and 33. Note that a unit of the processing capacity uses one which is suited to an index of the processing time unique to the system.

Each job processing amount (the number of divided jobs) is a value obtained by multiplying the processing capacity and sleep shift time (the time that allows processing). The job processing amounts of the printers 1201, 1202, and 1204 are respectively 400, 200, and 100.

Based on these job processing amounts, the TM 3034 distributes a divided job at a ratio of about 4/7 (=400/700) of the job processing amount to the printer 1201, and distributes divided jobs at ratios of about 2/7 and 1/7 to the printers 1202 and 1204. Note that the job division unit may be unique to the type of processing. For example, in case of processing which is independent for each page like rendering processing, rendering processing jobs of the numbers of pages corresponding to the division ratios can be distributed.

Note that the printers 1201, 1202, and 1204 go to the sleep state when their sleep shift times elapse after completion of the distributed divided jobs. In other words, the processing of each divided job does not influence the sleep shift time. When a normal print or copy job is entered, the printers 1201 to 1204 return to an active state, and their sleep shift times are reset.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-168409, filed on Jun. 8, 2005 which is hereby incorporated by reference herein in its entirety.

What is claimed is:

1. An information processing apparatus for managing distributed processing by a plurality of devices which are connected to a computer network and have a power-saving mode, comprising:
 a retriever, arranged to retrieve device information and an operation state of each device; and
 a selector, arranged to select target devices of the distributed processing,
 wherein the device information indicates a remaining time until the device will shift to the power-saving mode and a continuous time in an unused state of the device, and the operation state indicates whether or not the device is in the power-saving mode,
 wherein said selector selects the target devices, each of which has the remaining time more than a predetermined first time, and the continuous time less than a predetermined second time, other than a device in the power-saving mode.

2. The apparatus according to claim 1, wherein the device information further indicates an unused time required until the device will shift to the power saving mode, which is set in the device and a consumption power of the device.

3. The apparatus according to claim 2, wherein said selector selects even the device in the power-saving mode, which requires the consumption power smaller than other devices, as the target device.

4. The apparatus according to claim 1, further comprising a notification section arranged to notify information indicating the target devices selected by said selector to a request source of the distributed processing.

5. An information processing apparatus for managing distributed processing by a plurality of devices which are connected to a computer network and have a power-saving mode, comprising:
 a retriever, arranged to retrieve device information and an operation state of each device; and
 a setter, arranged to set distributed processing amounts to be distributed to the plurality of devices based on device information and operation states retrieved from the plurality of devices,
 wherein the device information indicates a processing capacity of the device and a remaining time until the device will shift to the power-saving mode, and the operation state indicates whether or not the device is in the power-saving mode,
 wherein said setter determines the distributed processing amounts in accordance with the processing capacity and remaining time of each device other than a device in the power-saving mode.

6. The apparatus according to claim 5, further comprising a notification section arranged to notify the distributed processing amounts set by said setter to a request source of the distributed processing.

7. A method of controlling an information processing apparatus for managing distributed processing by a plurality of devices which are connected to a computer network and have a power-saving mode, the method comprising the steps of:
 retrieving device information and an operation state of each device; and
 selecting target devices of the distributed processing,
 wherein the device information indicates a remaining time until the device will shift to the power-saving mode and a continuous time in an unused state of the device, and the operation state indicates whether or not the device is in the power-saving mode,
 wherein in the selecting step, the target devices, each of which has the remaining time more than a predetermined first time, and the continuous time less than a predetermined second time, other than a device in the power-saving mode are selected.

8. A method of controlling an information processing apparatus for managing distributed processing by a plurality of devices which are connected to a computer network and have a power-saving mode, the method comprising the steps of:
 retrieving device information and an operation state of each device; and
 setting distributed processing amounts to be distributed to the plurality of devices based on device information and operation states retrieved from the plurality of devices,
 wherein the device information indicates a processing capacity of the device and a remaining time until the device will shift to the power-saving mode, and the operation state indicates whether or not the device is in the power-saving mode,
 wherein in the setting step, the distributed processing amounts are determined in accordance with the processing capacity and remaining time of each device other than a device in the power-saving mode.

9. A non-transitory computer-readable medium storing a computer-executable program for causing a computer to perform a method of controlling an information processing apparatus for managing distributed processing by a plurality of devices which are connected to a computer network and have a power-saving mode, the method comprising the steps of:
 retrieving device information and an operation state of each device; and
 selecting target devices of the distributed processing, wherein the device information indicates a remaining time until the device will shift to the power-saving mode and a continuous time in an unused state of the device, and the operation state indicates whether or not the device is in the power-saving mode, wherein in the selecting step, the target devices, each of which has the remaining time more than a predetermined first time, and the continuous time less than a predetermined second time, other than a device in the power-saving mode are selected.

10. A non-transitory computer-readable medium storing a computer-executable program for causing a computer to perform a method of controlling an information processing apparatus for managing distributed processing by a plurality of devices which are connected to a computer network and have a power-saving mode, the method comprising the steps of:

retrieving device information and an operation state of each device; and setting distributed processing amounts to be distributed to the plurality of devices based on device information and operation states retrieved from the plurality of devices, wherein the device information indicates a processing capacity of the device and a remaining time until the device will shift to the power-saving mode, and the operation state indicates whether or not the device is in the power-saving mode, wherein in the setting step, the distributed processing amounts are determined in accordance with the processing capacity and remaining time of each device other than a device in the power-saving mode.

* * * * *